United States Patent [19]

Church et al.

[11] Patent Number: 4,855,041

[45] Date of Patent: Aug. 8, 1989

[54] FLUID FILTER DRAIN ASSEMBLY

[75] Inventors: John F. Church; Steve A. Neff, both of Modesto, Calif.

[73] Assignee: Parker Hannifin Corporation, Cleveland, Ohio

[21] Appl. No.: 42,081

[22] Filed: Apr. 24, 1987

[51] Int. Cl.⁴ .................. B01D 35/00; F16K 24/02
[52] U.S. Cl. .................. 210/120; 210/232; 210/248; 137/203; 137/587
[58] Field of Search ............ 210/120, 248, 303, 114, 210/DIG. 5, 168, 171, 184, 232, 348, DIG. 13, DIG. 17; 137/203, 204, 172, 587, 588

[56] References Cited

U.S. PATENT DOCUMENTS

| | | | |
|---|---|---|---|
| 3,005,475 | 10/1961 | Beall, Jr. | 137/588 |
| 3,533,433 | 10/1970 | Berg | 137/204 |
| 3,783,889 | 1/1974 | Pyle | 137/204 |
| 4,269,333 | 5/1981 | Nakai et al. | 137/588 |
| 4,314,689 | 2/1982 | Wilson . | |
| 4,440,193 | 4/1984 | Matheson | 137/588 |
| 4,502,956 | 3/1985 | Wilson et al. . | |
| 4,585,022 | 4/1986 | Haas et al. | 137/172 |
| 4,626,348 | 12/1986 | Stone | 210/248 |
| 4,676,895 | 6/1987 | Davis | 210/184 |
| 4,724,074 | 2/1988 | Schaupp . | |

*Primary Examiner*—Benoit Castel
*Attorney, Agent, or Firm*—Ralph E. Jocke

[57] ABSTRACT

A drain assembly for diesel engine fuel filters and the like consists of separate drain and vent valves mounted closely adjacent one another in the bottom wall of the collection bowl of the filter and intercoupled so that actuation of the drain valve also actuates the vent valve after the drain valve has been opened. The vent valve is a spring biased valve located higher than the drain valve and preferably is a tire core type valve. The drain valve may be a spring biased push type valve or a valve threadedly mounted in the bottom wall of the collection bowl for vertical movement to open a valve seat in the collection bowl and in either embodiment includes a shoulder interengageable with the vent valve for actuation of the latter. Both drain valves include a hose connector which rotates relative to the collection bowl or cartridge assembly to facilitate replacement of the latter, the threaded type drain valve including a snap-in type swivel for the hose connector.

28 Claims, 5 Drawing Sheets

FLUID FILTER DRAIN ASSEMBLY

BACKGROUND OF THE INVENTION

This invention relates to fluid filters, and more particularly, to the drain assembly for draining contaminants from the collection bowl of such fluid filter.

One of the problems concerned with fluid filter assemblies, particularly for diesel engines and the like, is the removal of contaminants from the filter assembly which typically are collected in the bottom of a collection bowl and which may include not only water removed from the fuel, but solid particulate matter as well. These contaminants can foul the drain valves which are provided in the collection bowl for periodic maintenance purposes, which fouling often affects proper closure of the drain valve or results in the contaminants being retained in the filter assembly for possible reentrance in the fluid being filtered. Another problem associated with devices of this type is the difficulty in removing the contamination from the collection bowl in that if a simple drain valve is employed, a partial vacuum is created in the fluid filter resulting in a difficult, if not impossible, drainage process.

Prior art drain assemblies are known which are self-venting, but these often have been complex and costly to construct. Certain of these devices are constructed in such a manner that portions of the drain assembly might be completely unscrewed and the parts separated with possible loss of a component part. Further, on others there is a risk that the drain assembly might accidentally be left in its open position, with consequent loss of fuel. In many of these devices contamination near the drain or vent valve openings within the collection chamber, may tend to collect and prevent proper closing of the particular drain or vent valve and it would be advantageous to have a valve structure which would tend to clear the upper drain and vent passages during the draining cycle.

One form of prior art drain assembly is shown in U.S. Pat. No. 4,314,689. In this device the drain valve includes a plug disposed in the internal passage which cooperates with a transverse bore in the drain valve in such a manner as to prevent contamination of the actuation device. This form of valve provides an efficient type of drain valve which is not so subject to clogging conditions.

Another form of drain valve assembly is shown in U.S. Pat. No. 4,502,956. In this assembly the drain valve is designed to cooperate with first and second collection zones within the collection portion of the filter, which zones are walled off from one another and commonly relieved by the drain valve mechanism. In this arrangement one contaminant outlet is upstream of all of the filter media in the filter assembly and the second contaminant outlet is downstream of at least a portion of the filter media.

Still another form of drain valve assembly is shown in U.S. patent application Ser. No. 784,300 now U.S. Pat. No. 4,724,074 assigned to the assignee of the instant invention. This drain assembly has a self-venting feature wherein a first opening in the valve assembly is uncovered to allow an initial discharge of the fluid in the collection bowl or the like, with a second opening thereafter uncovered to allow air to be introduced into the collection bowl to assist in the drainage process. This form of drain valve assembly comprises a threaded plug having plural passages therein and which are in fluid communication with a pair of outlets in the bottom wall of the collection bowl, one of the outlets being at a higher elevation therein than the other.

SUMMARY OF THE INVENTION

The apparatus of the instant invention is an improvement over such prior art devices in providing a simplified drain valve assembly comprising the combination of individual drain and vent valves which are disposed in the bottom wall of the collection bowl of a fluid filter for diesel engine fuel and the like, and which valves coact in their motion to provide a sequential initial opening of the drain valve and a later opening of the vent valve.

The drain valve and vent valve are disposed closely adjacent one another in the bottom wall of the contaminant collection bowl with the drain valve mounted in such a way that it can be rotated relative to the collection bowl and/or the cartridge in the fuel filter assembly and to provide a vertical motion for opening and closing the drain valve. The drain valve includes an annular flange thereon which during its upward motion engages the actuating member of the vent valve to open the latter only after the drain valve has been initially opened. In one embodiment of the invention the drain valve is a push type valve which is spring biased to a closed position and has the valve seat formed in the bottom wall of the collection bowl. In both embodiments of the invention the vent valve is also a spring loaded valve, biased to the closed position and mounted in such a disposition that the seat thereof is at a higher elevation than the seat of the drain valve. Preferably, in both embodiments of the invention the vent valve is a tire core type valve commonly known in the trade as a Schrader type valve which is commonly employed for introducing air into vehicle tires and the like.

In a preferred embodiment of the invention the drain valve comprises a valve stem threaded into the bottom wall of the collection bowl for achieving vertical movement and opening and closing of the drain valve seat therein by rotation of the valve stem. This valve also includes an annular flange which engages the vent valve to open the latter after the drain valve has been opened. In both embodiments of the invention a hose connector is included as a portion of the drain valve assembly to provide means for directing fluid by way of flexible hose or tubing to a discharge location, which valve assemblies allow relative rotation between the hose connector and the collection bowl and/or the cartridge of the valve for replacement of the latter, while maintaining the hose untwisted. In the preferred embodiment of the invention a swivel connection is employed between the hose connector and the stem of the drain valve to allow such relative rotation.

BRIEF DESCRIPTION OF THE DRAWINGS

Referring now to the drawings.

DETAILED DESCRIPTION OF THE PREFERRED EMBODIMENTS

Figure 1:
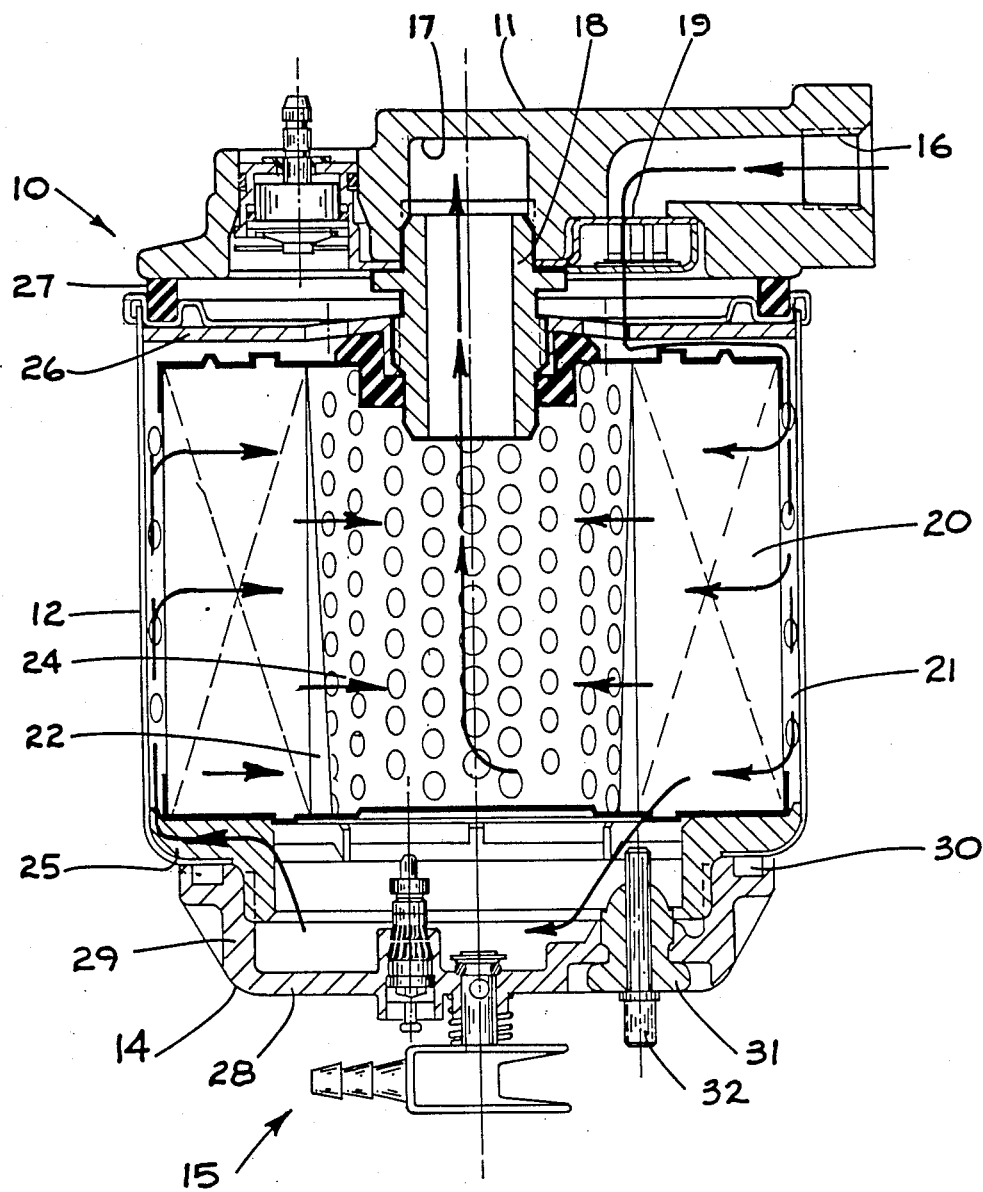
FIG. 1 is a sectional view of a fluid filter assembly including one embodiment of drain valve assembly located in the bottom wall of the collection bowl thereof.

Referring now to the drawings, FIG. 1 describes a typical fluid filter assembly 10 comprising filter head 11, filter cartridge 12, collection bowl 14 and drain assembly 15. Filter head 11 is conventionally mounted to the engine or other appropriate location in an engine compartment and comprises an inlet port 16 and outlet port 17 and includes a central threaded connector tube 18 in fluid communication with outlet port 17. A heater element 19 may be included in filter head 11 for heating diesel fuel and the like prior to filtration of same, but the details of the heater are not essential to an understanding of the instant invention.

Filter cartridge 12 is a cylindrical casing containing annular filter medium 20 separating the cartridge into peripheral fuel zone 21 and central fuel chamber 22 and may also include perforated support tube 24 in the central fuel chamber 22. Adapter ring 25 is included in the lower portion of the filter cartridge 12 being externally threaded on a lower tubular portion thereof for receipt of collection bowl 14. Cartridge 12 includes a rigid upper wall 26 which is threadedly received on connector tube 18 and which allows ready replacement of cartridge 12 for service and maintenance purposes. An annular seal 27 is included at the top of cartridge 12 for sealing engagement with filter head 11 and to establish closed fluid communication paths between the fuel chambers 21, 22 in cartridge 12 and the inlet and outlet ports 16, 17.

Collection bowl 14 is a cup-shaped member having bottom wall 28 and peripheral side wall 29, the latter internally threaded and adapted to be received on the threaded portion of adapter ring 25 for securement and separation from cartridge 12. A typical o-ring seal 30 provides a fluid tight connection between collection bowl 14 and cartridge 12.

It will be understood that fuel to be filtered enters filter head 11 at inlet port 16 and is directed by way of heater element 19 to outer peripheral chamber 21, to flow through filter medium 20, central peripheral chamber 22 and by way of connector tube 18 to outlet port 17. Water and other contaminants which tend to collect on the outer periphery of filter medium 20 will drop to the lower portion of peripheral fuel chamber 21 and pass through radial channels in adapter ring 25 to be deposited in the bottom of collection bowl 14. Collection bowl 14 further includes in the bottom wall 28 thereof water sensor element 31 which can detect the presence of water at a certain level in collection bowl 14 to provide a signal that such contaminants should be removed therefrom. Such water sensor essentially comprises conductive rod 32 which passes through an insulated sleeve of the water sensor and thus through the bottom wall of collection bowl 14 to be contacted by the water therein.

Figure 2:
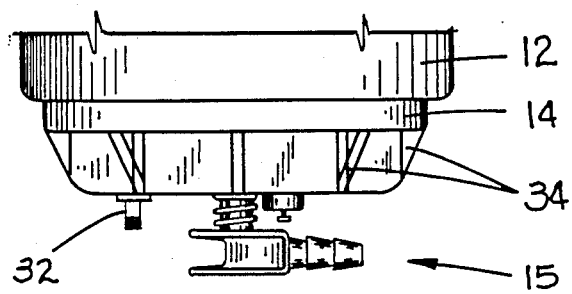
FIG. 2 is an elevational view of the collection bowl portion and drain valve assembly of FIG. 1.
Figure 3:
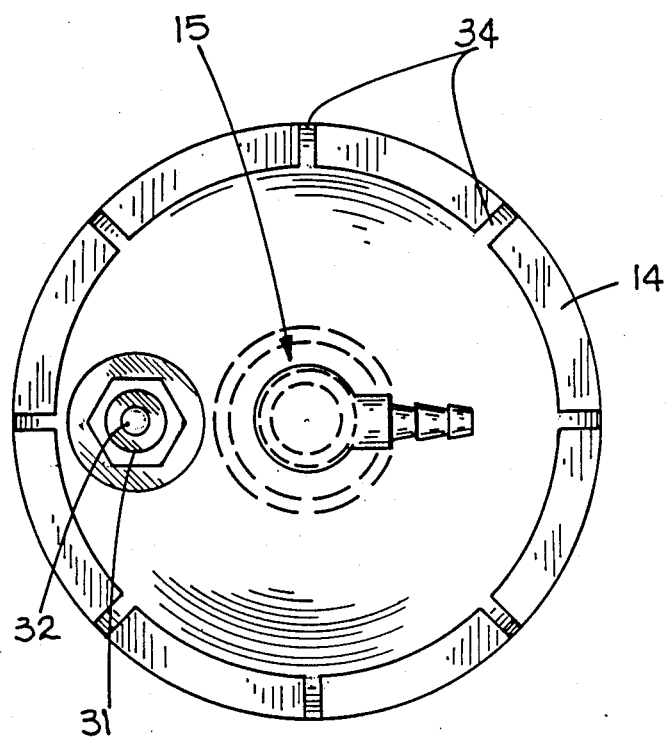
FIG. 3 is a bottom view of the collection bowl and drain valve assembly of FIG. 2.

The circular configuration of collection bowl 14 may be seen more clearly in the elevation and bottom views of FIGS. 2 and 3 respectively which also include views of the water sensor 31 and drain valve assembly 15. Collection bowl 14 preferably includes a plurality of ridges 35 distributed about its periphery to assist in gripping and twisting of the latter relative to cartridge 12 for removal and replacement purposes.

Figure 4:
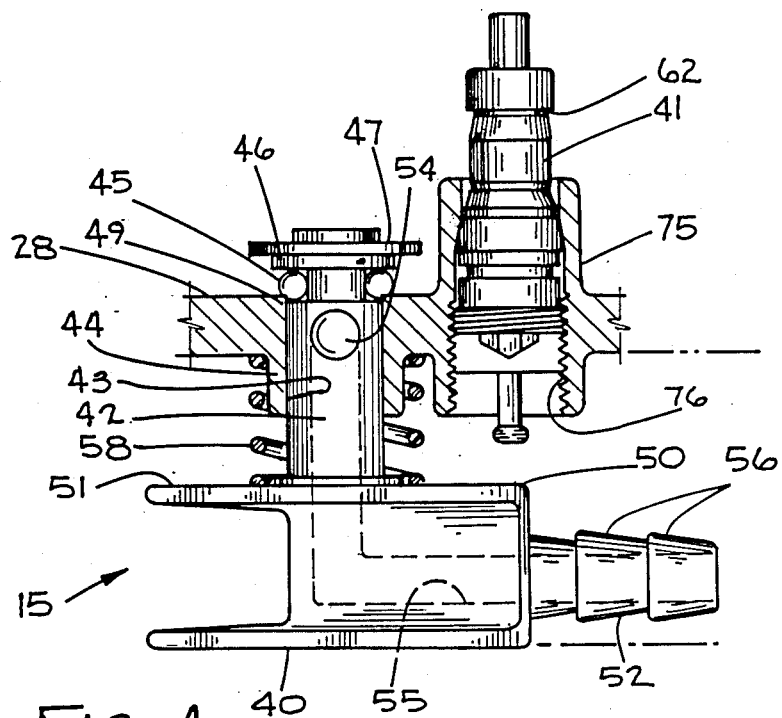
FIG. 4 is an enlarged elevational view partly in section of the drain valve assembly of FIG. 1 shown in the closed condition.
Figure 5:
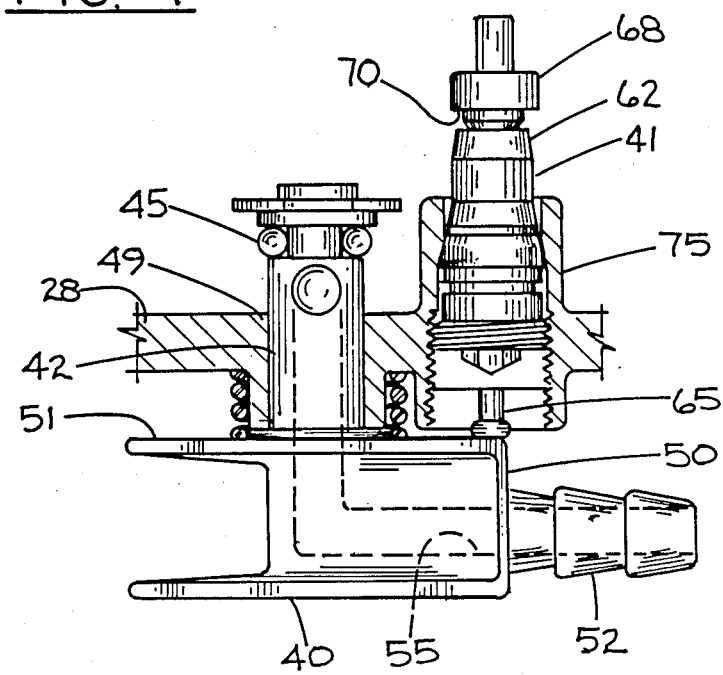
FIG. 5 is an enlarged elevational view partly in section of the drain valve assembly of FIG. 1 shown in the open condition.

One embodiment of drain valve is shown more clearly in the enlarged views of FIG. 4 and 5 as comprising drain valve 40 and vent valve 41 mounted closely adjacent one another in the bottom wall 28 of collection bowl 14. Drain valve 40 comprises cylindrical valve stem 42 slidably and rotatably mounted in bore 43 formed in the bottom wall 28 and a downwardly protruding hub portion 44 for further support. The inner end of valve stem 42 is reduced and receives o-ring seal 45 which is further held in place by means of washer 46 and snap ring 47 so that o-ring seal 45 is supported for movement with valve stem 42. The inner end of bore 43 at the junction of the inner surface of bottom wall 28 forms annular valve seat 49 through which valve stem 42 extends and against which o-ring seal 45 engages for opening and closing of drain valve 40.

At the lower portion of valve stem 42 and integral therewith is annular flange 50 which is a generally circular member which extends transversely sufficiently far to underlie vent valve 41 and which includes shoulder 51 as the upper surface portion thereof and a transversely extending hose connector 52. Annular flange 50 serves to couple drain valve 40 and vent valve 41 for common actuation.

A cross bore 54 is included in the upper portion of valve step 42 just below the location of valve seal 45 and which communicates by way of right angle bore 55 in stem 42 and flange 50 with hose connector 52, the latter having a plurality of barbs 56 thereon and comprising a push on connector or coupling for hose or tubing which serves to direct contaminants away from drain assembly 15 to a remote location. A coil spring is disposed over hub 44 and acts between bottom wall 28 and shoulder 51 of annular flange 50 to urge drain valve 40 to the normally closed condition depicted in FIG. 4.

Figure 8:
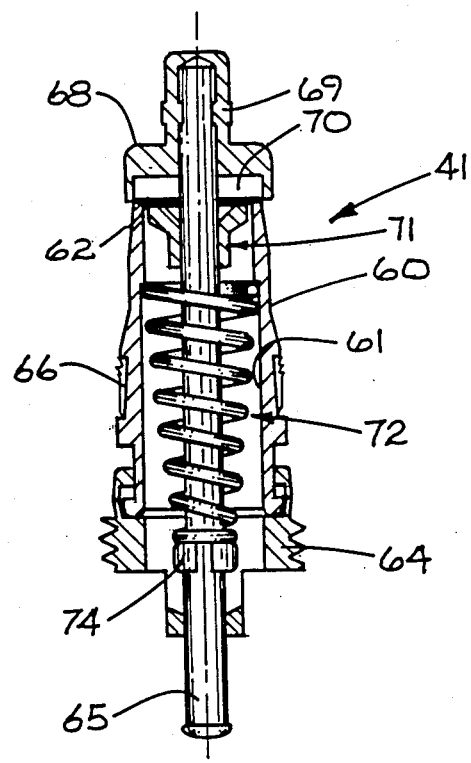
FIG. 8 is an enlarged sectional view of the vent valve forming a part of the drain valve assemblies.

Vent valve 41 is seen in more detail in the cross sectional view of FIG. 8 as comprising a tubular, typically brass body plug 60 having a central bore 61 therein terminating at one end in annular valve seat 62 and closed at the other end by an externally threaded plug member 64, the latter being securely clenched to body member 60 and adapted for sliding receipt of valve pin 65. Body plug 60 includes sleeve seal 66 at a midportion of its periphery to provide sealing engagement with the bore in which the vent valve 41 is located. At its upper end, vent valve 41 includes plunger cup 68 which is also clenched as at 69 to valve pin 65 for movement therewith, plunger cup 68 receiving annular plunger washer 70, the latter further retained in place by ferrule 71 secured to valve pin 65, all of which move with valve pin 65 as an assembly. A conical compression spring 72 is positioned between an internal shoulder in body plug 60 and a further ferrule 74 clenched to valve pin 65 to urge valve pin 65 in a downward direction and thus to urge plunger washer 70 into engagement with valve seat 62 to provide a normally closed condition for vent valve 41.

Referring more particularly to FIG. 5, it may be seen that vent valve 41 is positioned in boss 75 in bottom wall 28 of collection bowl 14, which boss 75 has a partly threaded interior bore 76 to place valve seat 62 of vent valve 41 at a higher elevation in collection bowl 14 than valve seat 49 of drain valve 40. As drain valve 40 is actuated by manual elevation of annular flange 50, o-ring seal 45 will be elevated from valve seat 49 to allow initial flow of liquid and contaminants in collection bowl 14 through cross bore 54, right angle bore 55 and outwardly of hose connector 52. During this initial priming phase a partial vacuum will be drawn in collection bowl 14, cartridge 12 and a part of filter head 11 preventing or interfering with drainage of fluid through outlet bore 55. As drain valve 40 is further elevated, shoulder 51 of annular flange 50 will engage valve pin 65 of vent valve 41 to cause opening of the latter. As depicted in FIG. 5 in the fully open position annular flange 50 has been fully elevated into contact with boss 44 fully compressing spring 58 and elevating valve pin 65 against the bias of compression spring 72 to raise plunger cup 68 and plunger washer 70 contained therein to a position spaced from valve seat 62. In this condition a path for entry of air into collection bowl 14 is provided by way of the bore in lower plug member 64, the bore 61 of body plug 60 and valve seat 62. Replacement of air within collection bowl 14 will allow complete drainage of the fluid and contaminants contained therein through the outlet bore 55 of drain valve 40.

It will be noted that the transverse extent of annular flange 50 of drain valve 40 is sufficient so that a portion of shoulder 51 underlies valve pin 65 no matter what the angular orientation of drain valve 40 with respect to collection bowl 14. It is also apparent that drain valve 40 may be held in a stationary position as when connected to drainage hose or the like so that collection bowl 14 and/or cartridge 12 may be unthreaded from one another or from filter head 11 for replacement or maintenance purposes without removing the hose. In all angular orientations the cooperation between drain valve 40 and vent valve 41 is maintained. It will be further apparent that when upward pressure is released from drain valve 40, the latter will be urged to its normally closed position by return spring 58 and that vent valve 41 will similarly be returned to its normally closed condition by internal conical spring 72 until the respective positions depicted in FIG. 4 are attained. It will still further be apparent that annular flange 50 of drain valve 40 provides a protective shield over valve pin 65 to prevent inadvertent actuation of the latter other than when drain valve 40 is intentionally being actuated. Still further, it will be clear that both drain valve 40 and vent valve 41 have a self cleaning characteristic for contaminants which may be located about the respective valve seats 49, 62. Thus, as valve stem 42 is raised and lowered relative to bottom wall 28, a scraping action will occur at valve seat 49 tending to clear contaminants thereat with the cross bore 54 normally being protected from contamination by being disposed in bore 43 below the normally closed valve seat 49. Similarly, in vent valve 41 when plunger washer 70 is elevated above vent valve seat 62 and air flows through central bore 61, the inrush of air will tend to clear contaminants from valve seat 62 so that closing of vent valve 41 will not be impeded.

Figure 6:
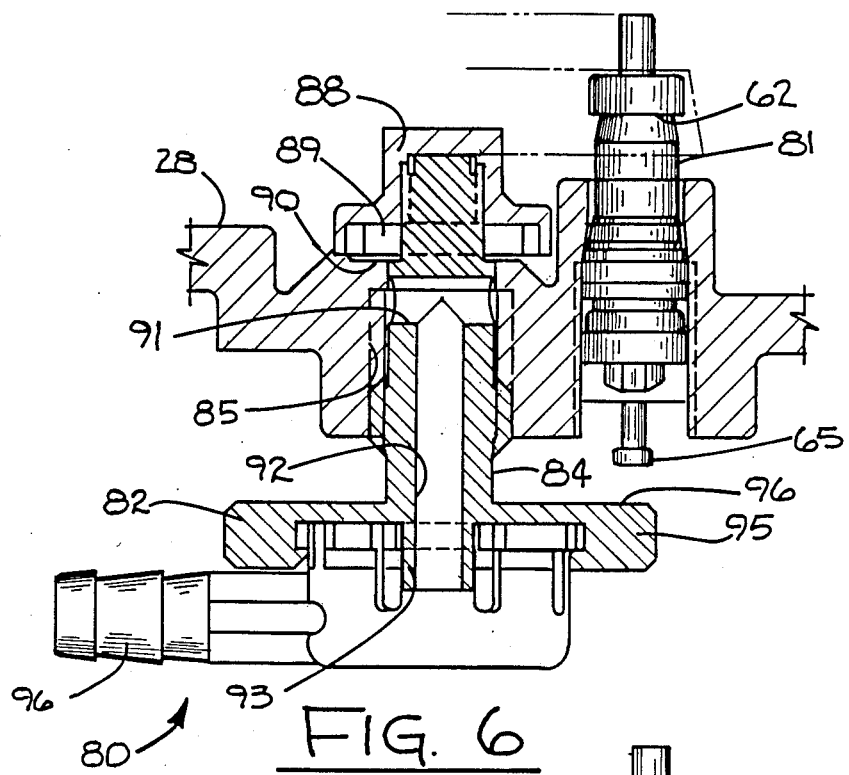
FIG. 6 is an enlarged elevational view partly in section of the preferred embodiment of drain valve assembly shown in the closed condition.
Figure 7:
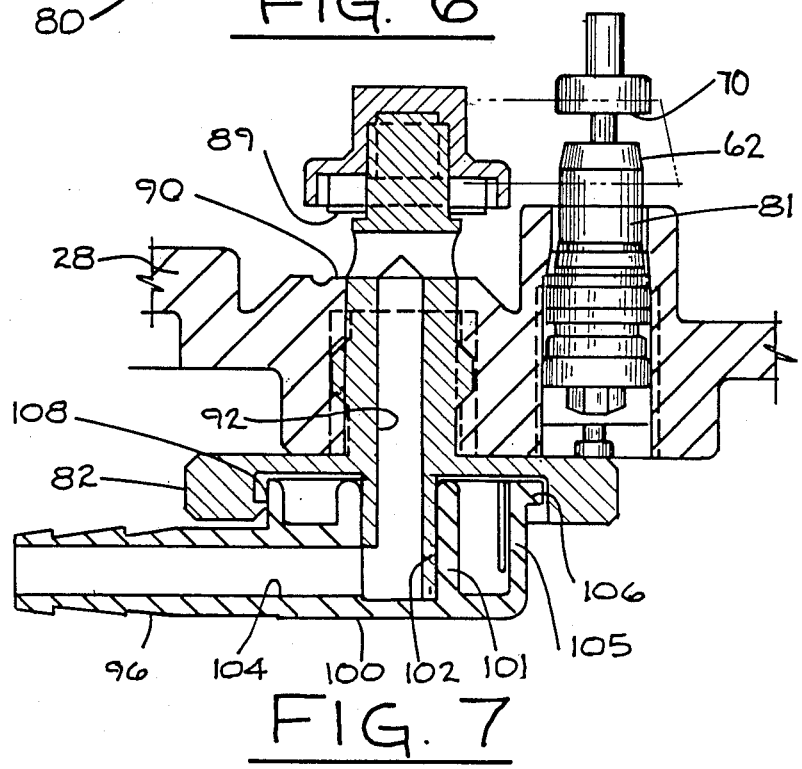
FIG. 7 is an enlarge elevational view partly in section of the preferred embodiment of drain valve assembly shown in the open condition.

While the embodiment of the invention depicted in FIGS. 4 and 5 provides a simplified structure and easily actuatable drain valve assembly, it is desired in certain instances to have a more secure configuration of drain valve structure which can be forceably retained in its full open and full closed conditions and which is not subject to inadvertent opening thereof. For this reason the preferred assembly of drain valve assembly 80 depicted in FIGS. 6 and 7 is provided. Drain valve assembly 80 comprises an identical vent valve 81 and a similar drain valve 82, the latter comprising an externally threaded cylindrical body member 84 received in threaded bore 85 in the bottom wall 28 of collection bowl 14. Drain valve body member 84 includes threaded cap 88 at its upper end which houses and retains annular seal 89 for movement with body member 84 into engagement with annular valve seat 90 formed in the inner surface of bottom wall 28, again at an elevation substantially below that of valve seat 62 of vent valve 81. Body member 84 includes cross bore 91 at the upper portion thereof below valve seal 89 which is in communication with central bore 92 terminating at boss 93 at the lower end thereof. Body member 84 further includes integral annular flange 95 at the lower end thereof similar to flange 50 of drain valve 40, being of generally circular configuration and having an upper circular surface forming shoulder 96 for engagement with valve pin 65 of vent valve 81.

It will be apparent then as annular flange 95 of drain valve 80 is rotated from the position depicted in FIG. 6, valve seal 89 will be initially lifted from valve seat 90 to allow fluid communication to cross bore 91 and outlet bore 92 and an initial priming of the chamber formed by collection bowl 14. Upon continued upward movement, shoulder 96 of annular flange 95 will engage valve pin 65 to move vent valve seal 70 to a position separated from vent valve seat 62 allowing the entrance of air through valve 81 in a manner similar to that described with respect to the first embodiment of the invention. The fully open position of drain valve assembly 80 is shown in FIG. 7. Similarly, when annular flange 95 is threaded in the opposite direction to return drain valve 80 to its lowermost position as depicted in FIG. 6, valve seal 89 may be urged into tight and secure engagement with valve seat 90 to provide a secure closure of drain valve 80. During this downward movement, vent valve 81 will be returned to its normally closed condition by internal compression spring 72 in a manner similar to that previously described.

Figure 9:
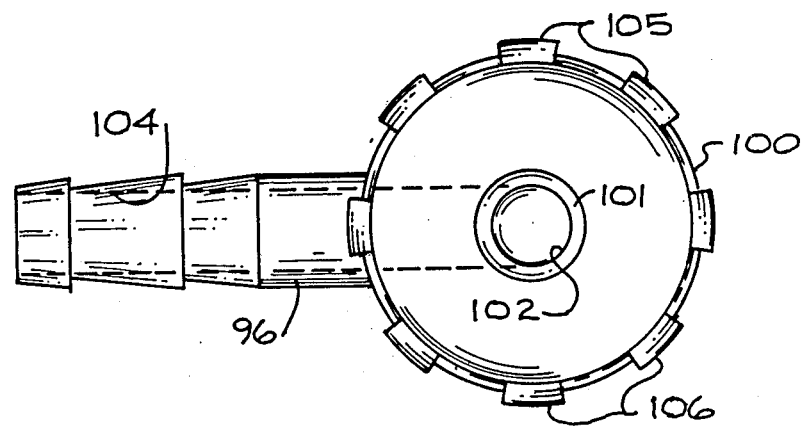
FIG. 9 is a plan view of the hose connector portion of the drain valve assembly of the preferred embodiment of the invention, removed from the remainder of the assembly.

Drain valve 80 further includes hose connector 96, again including a laterally extending barb-type coupling, and a swivel connection between hose connector 96 and annular flange 95. As seen more clearly in FIG. 9, hose connector 96 comprises circular body member 100 having a central upstanding boss 101 with a central bore 102 therein in communication with coupling bore 104 passing through the barbed coupling portion of hose connector 96. Hose connector 96 further includes a plurality of circumferentially spaced upstanding flanges 105 surrounding boss 101, each flange 105 having a laterally extending barb 106 at the upper tip thereof adapted to be received in an annular groove 108 formed in the bottom of annular flange 95 in a slidable, snap fit, swivel connection therein. Hose connector 96 is preferably an injection molded plastic member allowing a certain degree of resilience to flanges 105 to allow them to be pressed into groove 108 and to be retained therein. As hose connector 96 is placed on the lower portion of body member 84, boss 93 will be received in bore 102 of boss 101 in a press-fit engagement to provide a fluid tight interconnection therebetween, even though hose connector 96 may be rotated relative to adapter flange 95. Thus, it may be seen that hose connector 96 may be retained in a stable axial position, connected to hose or tubing, while adapter flange 95 is threaded relative to bottom wall 28 or while collection bowl 14 is rotated relative to cartridge 12 as well as when cartridge 12 is rotated relative to fluid head 11 when being removed for replacement and maintenance purposes.

It may also be seen that a self cleansing action of the drain valve 80 of the preferred embodiment of the invention is achieved when valve stem 84 is elevated and that cross bore 91 is protected within bore 85 beneath valve seal 89 and valve seat 90 in a manner similar to that previously described with respect to the first embodiment of drain valve 40.

We claim:

1. A drain assembly comprising
   a fluid chamber,
   first and second valves operative sequentially, first to initiate drainage of said fluid chamber in which said valves are disposed and then to open a vent to release a partial vacuum in said chamber as fluid is drained therefrom,
   said first valve having a valve seat disposed at a first location in said chamber,
   said second valve having a valve seat disposed at a second location higher in vertical disposition than said first location,
   said first valve having an open position and a closed position and movable therebetween for controlling fluid flow through said first valve seat, and
   means coupling said first and second valves for actuating said second valve in response to movement of said first valve as said first valve is between said open and closed positions.

2. The drain assembly set forth in claim 1 wherein said first and second valves are located closely adjacent one another in the bottom wall of said chamber and are adapted for vertical movement between open and closed positions of each said valve, said coupling means comprising a shoulder on said first valve adapted for vertical movement with said first valve and engageable with said second valve for actuation of the latter.

3. The drain assembly set forth in claim 2 wherein said second valve is a spring loaded, normally closed valve having an actuating pin and a valve seal disposed on said pin for movement therewith relative to said valve seat, said valve pin extending outwardly of said fluid chamber and engageable by said shoulder of said first valve for actuation of said second valve.

4. The drain assembly set forth in claim 3 wherein said first valve comprises a spring loaded, normally closed, push to open valve having a body stem mounted for vertical movement in said chamber bottom wall, an o-ring seal mounted at the upper end of said body stem within said chamber, said shoulder being located at the lower end of said body stem outside said chamber and engageable with said pin of said second valve.

5. The drain assembly set forth in claim 3 wherein said first valve comprises a body stem threadedly engaged with said chamber bottom wall for vertical movement relative thereto, said stem having an annular seal at the upper end thereof within said chamber adapted for movement with said stem and for opening and closing engagement with said valve seat, said stem having a central bore therein and an outlet located outside said chamber, and a swivel connector at said stem outlet for coupling said stem to a fluid discharge line and the like.

6. The drain assembly set forth in claim 1 wherein said first and second valves are located laterally adjacent one another and each is mounted in a bottom wall of said chamber for vertical movement between open and closed positions for controlling fluid flow through each said valve seat, said coupling means couples said first and second valves after initial opening movement of said first valve for actuating said second valve in response to movement of said first valve, and said second valve remains in the closed position thereof during said initial opening movement of said first valve.

7. A drain assembly comprising
   a cup-like container having a bottom wall and a peripheral side wall forming a fluid enclosure,
   means forming a drain valve seat in said bottom wall,
   a drain valve mounted in said bottom wall for draining fluid from said enclosure,
   a vent valve mounted in said bottom wall for admitting air to said enclosure to assist in draining fluid through said drain valve,
   said drain valve being rotatable and located closely adjacent said vent valve and being axially movable relative to said container and adapted to engage said vent valve during a portion of such axial movement to open and close said vent valve,
   said drain valve comprising a cylindrical body member passing through said container bottom wall, having an upper end disposed within said enclosure and a lower end disposed outside said enclosure, a drain bore in said body member in fluid communication with said upper and lower ends, and a valve seal supported on said body member for movement therewith for opening and closing said valve seat, said drain valve seat having a drain valve seat surface which is engaged by said valve seal to close said valve seat, said drain valve seat surface being disposed closely adjacent said container bottom wall, said vent valve having a vent valve seat surface disposed at a higher location in said container than said drain valve seat surface, and said drain valve seat surface being annular and surrounding said cylindrical body member.

8. The drain assembly set forth in claim 7 wherein said drain valve seal is annular.

9. The drain assembly set forth in claim 7 further comprising a hose connector at the lower end of said body member, said hose connector being rotatable relative to said container.

10. The drain assembly set forth in claim 9 wherein said drain valve is a push valve and further comprising spring means biasing said drain valve to a closed condition.

11. The drain assembly set forth in claim 9 wherein said drain valve is threadedly engaged with said container and said vent valve is spring biased to a normally closed condition.

12. A fluid filter for vehicle engines, said filter comprising
    a filter head having inlet and outlet ports for fluid flow therethrough,
    a filter casing supported on said filter head, said filter casing having a filter element therein forming inlet and outlet chambers respectively communicating with said inlet and outlet ports, a contaminant collection chamber beneath said filter element, and a drain valve assembly for draining contaminants from said collection chamber, said drain valve assembly comprising a drain valve member, means for mounting said drain valve member in the bottom wall of said collection chamber for vertical movement between a lower closed position and an upper open position, a vent valve member, and means for mounting said vent valve member in the bottom wall of said collection chamber adjacent said drain valve member, for movement between a lower closed position and an upper open position, said vent valve member being engageable by said drain valve member as said drain valve member is moved vertically upward to open said vent valve member for permitting air into said collection chamber.

13. The fluid filter set forth in claim 12 wherein said vent valve member is disposed vertically higher than said drain valve member, and said drain valve member is movable to an open position prior to engagement of said vent valve member.

14. A fluid filter for vehicle engines, said filter comprising a filter head having inlet and outlet ports for fluid flow therethrough, a replaceable filter cartridge threadedly supported on said filter head, said filter cartridge having an annular filter element therein forming peripheral and central fuel chambers, and an adapter at the lower portion thereof, a contaminant collection bowl threadedly connected to said cartridge adapter forming a fluid tight enclosure with said cartridge and filter head, and a drain valve assembly in said collection bowl for draining contaminants therefrom, said drain valve assembly comprising a drain valve mounted in the bottom wall of said collection bowl for vertical movement between a lower closed position and an upper open position, a vent valve mounted in the bottom wall of said collection bowl adjacent said drain valve, for movement between a lower closed position and upper open position, said vent valve being engageable by said drain valve as said drain valve is moved vertically upward to open said vent valve for permitting air into said collection bowl, said vent valve being disposed vertically higher than said drain valve and said drain valve being movable to an open position prior to engagement of said vent valve.

15. The apparatus set forth in claim 14 wherein said drain valve is rotatably mounted in the bottom wall of said collection bowl, said drain valve further comprising a hose connector thereon, said hose connector capable of being held stationary as said cartridge and said collection bowl are threadedly connected and disconnected.

16. The apparatus set forth in claim 15 wherein said drain valve comprises a spring loaded, push valve having a valve stem extending through the bottom wall of said collection bowl, a valve seal secured at the upper end of said valve stem, and a shoulder at the lower end of said valve stem engageable with said vent valve for moving said vent valve to an open position.

17. The apparatus set forth in claim 16 wherein said vent valve is spring loaded to a closed position and openable against said spring bias by engagement with said shoulder of said drain valve.

18. The apparatus set forth in claim 17 wherein said shoulder is circular so as to be engageable with said vent valve at any angle of disposition of said drain valve relative to said collection bowl.

19. The apparatus set forth in claim 15 wherein said drain valve comprises a cylindrical body member threadedly engaged in the bottom wall of said collection bowl for vertical movement relative to said collection bowl, said body member extending through the bottom wall of said collection bowl, a valve seal secured at the upper end of said body member, and a shoulder at the lower end of said body member engageable with said vent valve for moving said vent valve to an open position.

20. The apparatus set forth in claim 19 wherein said vent valve is spring loaded to a closed position and operable against said spring bias by engagement of said shoulder of said drain valve.

21. The apparatus set forth in claim 20 wherein said shoulder is circular so as to be engageable with said vent valve at any angle of orientation of said drain valve relative to said collection bowl.

22. The apparatus set forth in claim 21 wherein said body member comprises an axial bore extending from the upper end to the lower end of said body member and a cross bore at said upper end, said hose connector being pivotally secured to said body member for rotation relative thereto.

23. The apparatus set forth in claim 22 wherein said hose connector comprises a circular body having a plurality of upstanding, circumferentially spaced flanges thereon interengageable in a circular recess in said drain valve body member and rotatable relative thereto, said hose connector body further comprising a central upstanding boss having a bore therein adapted for a press-fit, fluid tight engagement with said body member, and a hose coupling extending laterally from said circular body, said hose coupling being in fluid communication with said central boss.

24. A drain assembly comprising:

a fluid chamber, drain and vent valve members operative sequentially, first to initiate drainage of said fluid chamber through a drain opening and then to open a vent to release a partial vacuum in said chamber as fluid is drained therefrom, means for mounting said drain member to said fluid chamber for movement between open and closed positions for controlling fluid flow through said drain opening, means for mounting said vent valve member to said fluid chamber for movement between open and closed positions for controlling fluid flow through said vent, and means coupling said drain and vent valve members for actuating said vent valve member in response to movement of said drain valve member as said drain valve member is moved between said open and closed positions, said drain and vent valve members being located laterally adjacent one another, said coupling means coupling said drain and vent valve members after initial opening movement of said drain valve member for actuating said vent valve member in response to movement of said drain valve member, and said vent valve member remaining in said closed position thereof during said initial opening movement of said drain valve member.

25. The drain assembly set forth in claim 24 wherein said drain valve member has a vertical axis and said coupling means includes a shoulder on said drain valve member, said shoulder extending beneath said vent valve member for engaging said vent valve member after said initial opening movement of said drain valve member.

26. A fluid filter comprising a filter head having an inlet and outlet port, a filter casing attached to said filter head, a filter element in said casing forming inlet and outlet chambers respectively connected to said inlet and outlet ports, and said drain assembly of claim 25, said fluid chamber forming a contaminant collection chamber disposed beneath said filter element.

27. A drain assembly comprising:
- a fluid chamber having a bottom wall and a peripheral side wall forming a fluid enclosure,
- a drain bore extending through said bottom wall and opening upwardly to said enclosure at a drain valve seating surface surrounding said drain bore, said drain valve seating surface being disposed closely adjacent said bottom wall of said fluid chamber,
- a vent bore extending through said bottom wall and opening to said enclosure at a higher location in said enclosure than said drain valve seating surface,
- a drain valve member passing through said drain bore and having a valve head including a valve seal for engaging said drain valve seating surface,
- means for mounting said drain valve member to said fluid chamber for vertical movement to open and close said drain bore, said seating surface being covered, and thereby protected, by said valve head when said drain bore is closed,
- a vent valve member, and
- means for mounting said vent valve member for vertical movement to open and close said vent bore.

28. The drain assembly set forth in claim 27 wherein said vent bore opens upwardly to said enclosure at a vent valve seating surface surrounding said vent bore, said vent valve member passes through said vent bore and has a valve head including a valve seal for engaging said vent valve seating surface, means are provided for mounting said vent valve member to said fluid chamber for vertical movement to open and close said vent bore, and said vent valve seating surface being covered, and thereby protected, by said vent valve head when said vent bore is closed.

* * * * *

UNITED STATES PATENT AND TRADEMARK OFFICE
CERTIFICATE OF CORRECTION

PATENT NO. : 4,855,041
DATED : August 8, 1989
INVENTOR(S) : John F. Church, Steve A. Neff It is certified that error appears in the above—identified patent and that said Letters Patent is hereby corrected as shown below:

Claim 1, Column 7, Line 36 the word "moved" is missing between the words "is" and "between".

Signed and Sealed this

Second Day of October, 1990

*Attest:*

HARRY F. MANBECK, JR.

*Attesting Officer*  *Commissioner of Patents and Trademarks*